(12) United States Patent
Erickson et al.

(10) Patent No.: US 9,069,894 B2
(45) Date of Patent: Jun. 30, 2015

(54) DATA COLLISIONS IN CONCURRENT PROGRAMS

(75) Inventors: John Erickson, Redmond, WA (US); Madan Musuvathi, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 899 days.

(21) Appl. No.: 12/819,069

(22) Filed: Jun. 18, 2010

(65) Prior Publication Data

US 2011/0314338 A1 Dec. 22, 2011

(51) Int. Cl.
*G06F 9/44* (2006.01)
*G06F 11/36* (2006.01)

(52) U.S. Cl.
CPC ........ *G06F 11/3632* (2013.01); *G06F 11/3644* (2013.01)

(58) Field of Classification Search
None
See application file for complete search history.

(56) References Cited

U.S. PATENT DOCUMENTS

| | | | | |
|---|---|---|---|---|
| 5,515,428 A * | 5/1996 | Sestak et al. | | 379/266.01 |
| 6,782,440 B2 * | 8/2004 | Miller | | 710/200 |
| 7,318,128 B1 * | 1/2008 | Dice | | 711/151 |
| 7,469,403 B2 | 12/2008 | Choi et al. | | |
| 7,516,446 B2 | 4/2009 | Choi et al. | | |
| 2003/0131283 A1 * | 7/2003 | Ur et al. | | 714/36 |
| 2004/0123185 A1 * | 6/2004 | Pierce et al. | | 714/38 |
| 2005/0216798 A1 * | 9/2005 | Yu | | 714/718 |
| 2005/0283781 A1 * | 12/2005 | Karp et al. | | 718/100 |
| 2006/0218356 A1 * | 9/2006 | Rodeheffer et al. | | 711/150 |
| 2007/0006047 A1 * | 1/2007 | Zhou et al. | | 714/38 |
| 2007/0067762 A1 | 3/2007 | Wadsworth et al. | | |
| 2007/0245312 A1 | 10/2007 | Qadeer et al. | | |
| 2008/0209436 A1 * | 8/2008 | Agha et al. | | 718/106 |
| 2009/0125887 A1 | 5/2009 | Kahlon et al. | | |
| 2010/0050161 A1 * | 2/2010 | Nir-Buchbinder et al. | | 717/126 |

OTHER PUBLICATIONS

Edelstein et al. "Multithreaded Java program test generation", 2002, IBM Systems Journal, vol. 41, No. 1, pp. 111-125.*
Edelstein et al. "Framework for testing multi-threaded Java programs", 2003, Concurrency and Computation: Practice and Experience, vol. 15, pp. 485-499.*
Testing Concurrent Java Programs using Randomized Scheduling—Published Date: 2002.
JThreadSpy: Teaching Multithreading Programming by Analyzing Execution Traces—Published Date: Jul. 9-12, 2007.
Race Directed Random Testing of Concurrent Programs—Published Date: Jun. 7-13, 2008.

* cited by examiner

*Primary Examiner* — Jue Louie
(74) *Attorney, Agent, or Firm* — Sandy Swain; Judy Yee; Micky Minhas

(57) ABSTRACT

Described are techniques for detecting data collisions between a first portion and a second portion of an application executing on a computer, the first portion and the second portions executing concurrently with respect to each other. While the first portion and second portion are executing, before the first portion accesses a memory location shared by the first portion and the second portion, a value stored in the memory location is captured and the first portion is delayed. While the second portion continues to execute the first portion is delayed. After a period of the first portion having been paused or slowed, the current content of the memory location is compared with the captured content to determine if there is a data collision. The first and second portions may be threads, and the capturing, delaying, and determining may be performed by code inserted to the application after it has been compiled.

17 Claims, 7 Drawing Sheets

DATA COLLISIONS IN CONCURRENT PROGRAMS

BACKGROUND

With increased use of multithreaded applications and multicore processors, data collisions between concurrent threads have become an increasingly significant problem for program developers and testers. Generally, when two threads are constructed to share memory or data in a systematic way (e.g., using thread locks or the like), data collisions do not occur. However, when two threads freely access shared memory, for example a shared object or variable, either might alter the shared object or variable without visibility to the other thread, and the other thread may obtain unexpectedly altered or inconsistent data from the shared object or variable, which is a data collision. Moreover, the occurrence of such a collision may not be immediately apparent to the program. In general, data collisions may cause in-deterministic program behavior.

To explain further, a data collision may be thought of as analogous to a traffic intersection without a traffic light, where the intersection is some shared memory (e.g., a shared register, object, variable, memory barrier, etc) and cars passing through the intersection are as threads freely accessing and updating the shared memory. Eventually two cars may collide at the intersection, just as one thread may update the shared memory during a time when another thread is accessing the shared memory.

Because such data collisions often manifest only later when the corrupt shared memory is inconsistent with program state expected by the program, data collisions have been difficult to detect. Approaches have tended to use complex analysis to predict when a data collision could occur. However, these approaches are often unreliable and may lead to false positive detection, that is, "detection" of a data collision when one has not occurred or when a data collision (an actual corruption of data) cannot occur due perhaps to some mutually exclusive program semantics. In addition, data collision detection has not been able to be performed at the kernel level.

Techniques related to data collision detection are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Data collisions between a first portion and a second portion of an application executing on a computer may be detected. The first portion and the second portions execute concurrently with respect to each other. While the first portion and second portion are executing, before the first portion accesses (reads or writes) a memory location shared by the first portion and the second portion, a value stored in the memory location is captured and the first portion is delayed. While the second portion continues to execute the first portion is delayed. After a period of the first portion having been paused or slowed, the current content of the memory location is compared with the captured content to determine if there is a data collision. The first and second portions may be threads, and the capturing, delaying, and determining may be performed by code inserted into the application after it has been compiled.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to detecting data collisions in programs with concurrently executing parts. An explanation of data collisions will be provided first, followed by explanation of a general approach involving a thread, before accessing a shared memory location, capturing the content of a shared memory location, pausing, and then after pausing checking to see if the current shared memory differs from what was captured, thus indicating whether the shared memory location was changed by some other thread as the shared memory location was about to be accessed. This will be followed by detailed description of how a program may be modified and run to detect data collisions. The makeup and behavior of such a modified program will be explained further with reference to program code.

Figure 1:
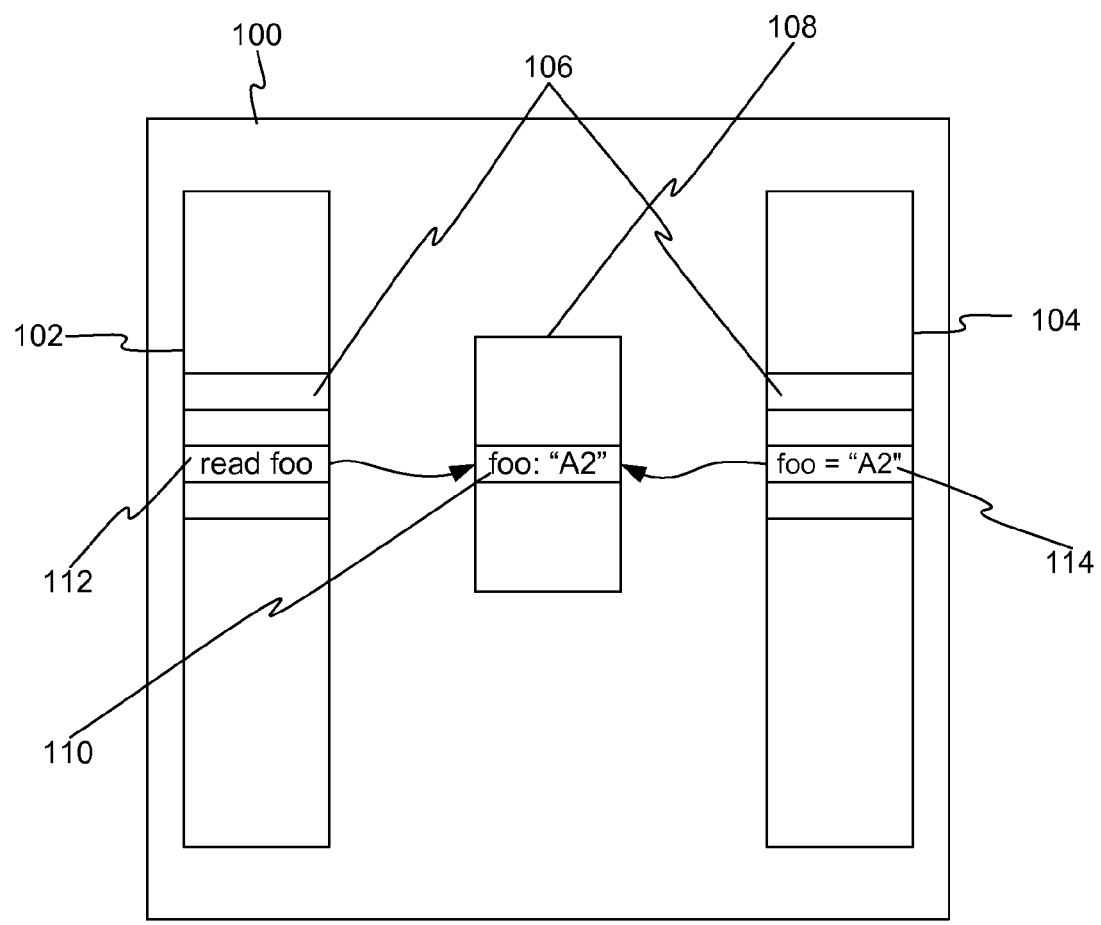
FIG. 1 shows an application executing a first thread and a second thread.

FIG. 1 shows an application 100 executing a first thread 102 and a second thread 104. A first thread 102 and a second thread 104 are shown executing. The application 100 and threads 102, 104 may be presumed to be executing on a computer, an example of which is described below with reference to FIG. 7. The threads 102, 104 are shown as operation stacks, including various known operations 106 executing in order from the top of FIG. 1. The threads 102, 104 both have read and write access to a portion of shared memory 108 of the computer, which, programmatically, may store objects, variables, registers, or the like.

The threads 102, 104 may have a potential data collision. A shared memory location 110 may be used by both first thread 102 and second thread 104. For example, first thread 102 might have a read operation 112 to access memory location 110, for example in the form of "somevariable=foo" (assign the content of foo to the content of somevariable). Memory reads can take many forms and occur in numerous ways known to those skilled in the art. A data collision may occur when the following events occur. The first thread 102 has some operations 106 near the read operation 112. As these execute and as the read operation 112 executes, the content stored in shared memory location 110 may be updated by the second thread 104, which, during or immediately before the read operation 112 may issue a write operation 114 to write new content ("A2") to shared memory location 110. First thread 102 may be executing under the semantic presumption that shared memory location 110 had a value (e.g., "A1") consistent with data state of first thread 102. Thus, when first thread 102 issues read operation 112 and obtains the content of shared memory location 110, it unknowingly obtains some extraneous content such as "A2", which may be inconsistent with the data state of first thread 102. First thread 102 may be able to continue executing without immediate failure, yet may eventually crash or store erroneous output. For example, if the shared memory location 110 stores a bank transaction amount, an associated account may be over credited or over debited.

Though FIG. 1 shows a read-write data collision, write-write data collisions are also possible. In such a case, if it is assumed that the first thread 102 issues a write operation instead of a read operation 112, corruption or the like may occur because the second thread 104 may overwrite the content stored into the shared memory location 110 by the first thread 102. For example, first thread 102 might write "A1", and second thread 104 might immediately overwrite it by storing "A2" in the shared memory location 110. Generally, two threads concurrently reading from shared memory cannot usually give rise to a data collision, but two threads concurrently reading while another thread concurrently writes could. As used herein, "access" will refer to either read or write access, and concurrent accesses of two threads will refer to either read-write access or write-write access.

Figure 2:
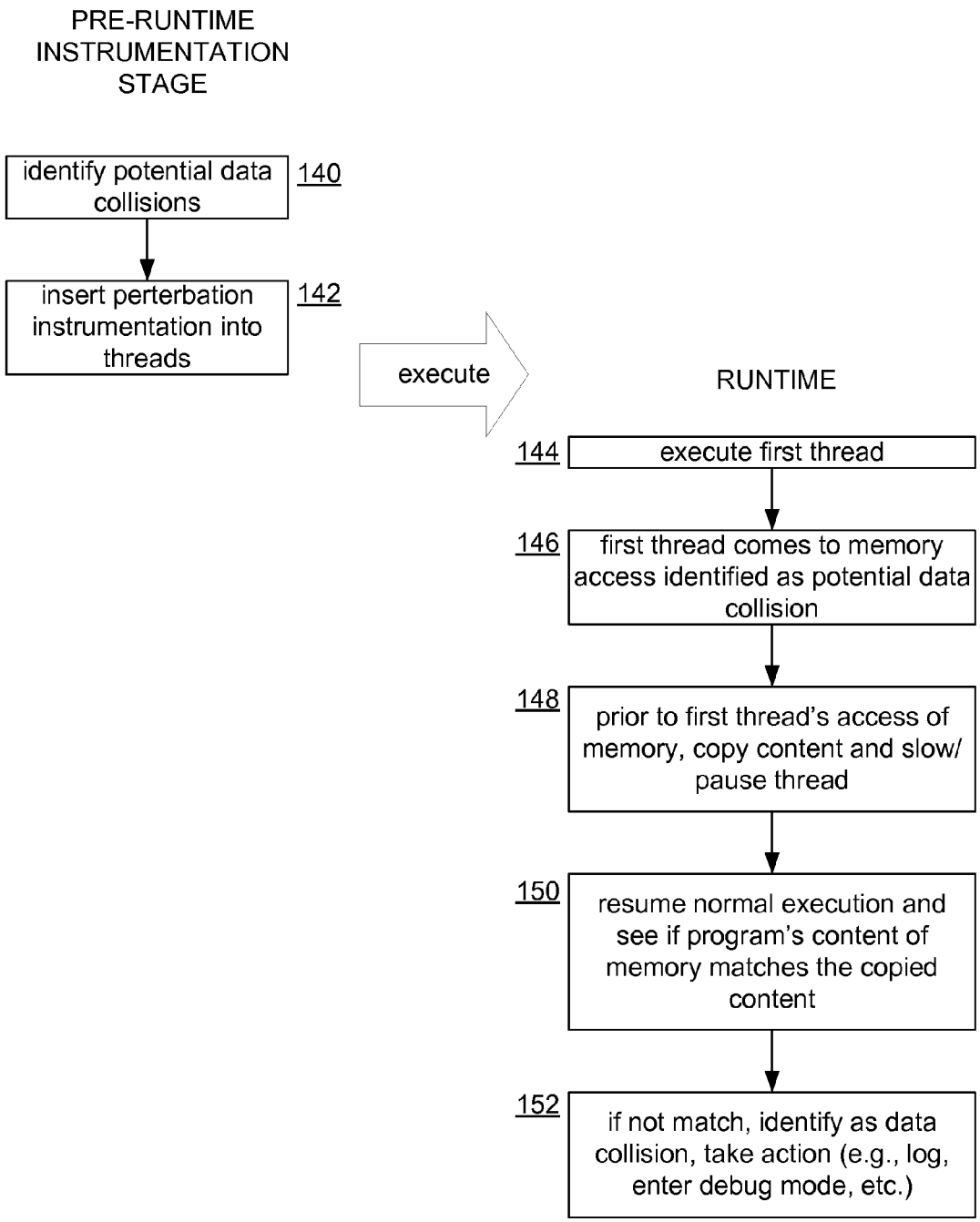
FIG. 2 shows an example implementation of a data collision detection technique.

FIG. 2 shows an example implementation of a data collision detection technique. In general, the technique involves artificially delaying a thread ((slowing, pausing, sleeping, suspending, lowering execution priority, etc.) when the thread comes to a shared memory access operation, and monitoring the value stored in that memory location to determine whether content of the shared memory location is externally changed (i.e., not changed by the thread being monitored) while the thread is delayed. The term "artificial" refers to an action that is not part of the program logic of the application program running the thread. In other words, given an optimized or "clean" compilation of the application program's source code, with no instrumentation or other extraneous interference, the same thread would execute without the artificial delay. The delay is "artificial" in that the normal operation of the application program and thread is altered such that it runs slower or with delay that would not occur if the application program were simply compiled and executed. During normal operation of the application program, the chance of two threads that are capable of colliding actually doing so may be small. By expanding the collision window, the chance of an actual collision occurring is increased. Moreover, by testing the shared data while a thread is thus delayed, an actual collision can be detected while it is in progress.

Returning to FIG. 2, where the following numerals correspond to steps in FIG. 2, in one embodiment, a thread may be artificially delayed by augmenting the program so that when it executes, code to test for data collisions is executed as part of the program in the memory space of the program. To do so, the program may be analyzed to identify potential data collisions, as shown in block 140. For example, accesses to data (a memory location) identified as shared may be identified. Then, instrumentation or test code corresponding to the identified accesses may be inserted into the program as shown in block 142. As shown in the next block 144, at runtime (when the program is running), a first thread may begin executing. At block 145, the first thread comes to a previously identified data or memory access, and at block 148 the content of the shared data is copied to a temporary register or variable and the first thread is slowed/paused (artificially delayed). At block 150, as (or just before) the threat resumes normal execution (i.e., executing native code not test code) to perform the data access identified at block 140, the content of the data is compared against the temporary copy, and at block 152 if the current content and copied content do not match, a data collision is identified, and some debugging action is taken, such as entering an interactive debug mode, displaying an alert, updating a database, logging information about the collision such as the line number in the program or an object or symbol name corresponding to the shared data, or other known actions for testing or debugging software.

Note that in block 148 the copying of the content can occur before or after the thread is delayed. Other operational orders can vary. For example, normal execution can resume before comparing the content of the shared memory with the copied content. Generally, the order of operations is not significant, as long as there is some delay before the current content is compared to the captured content.

Figure 3:
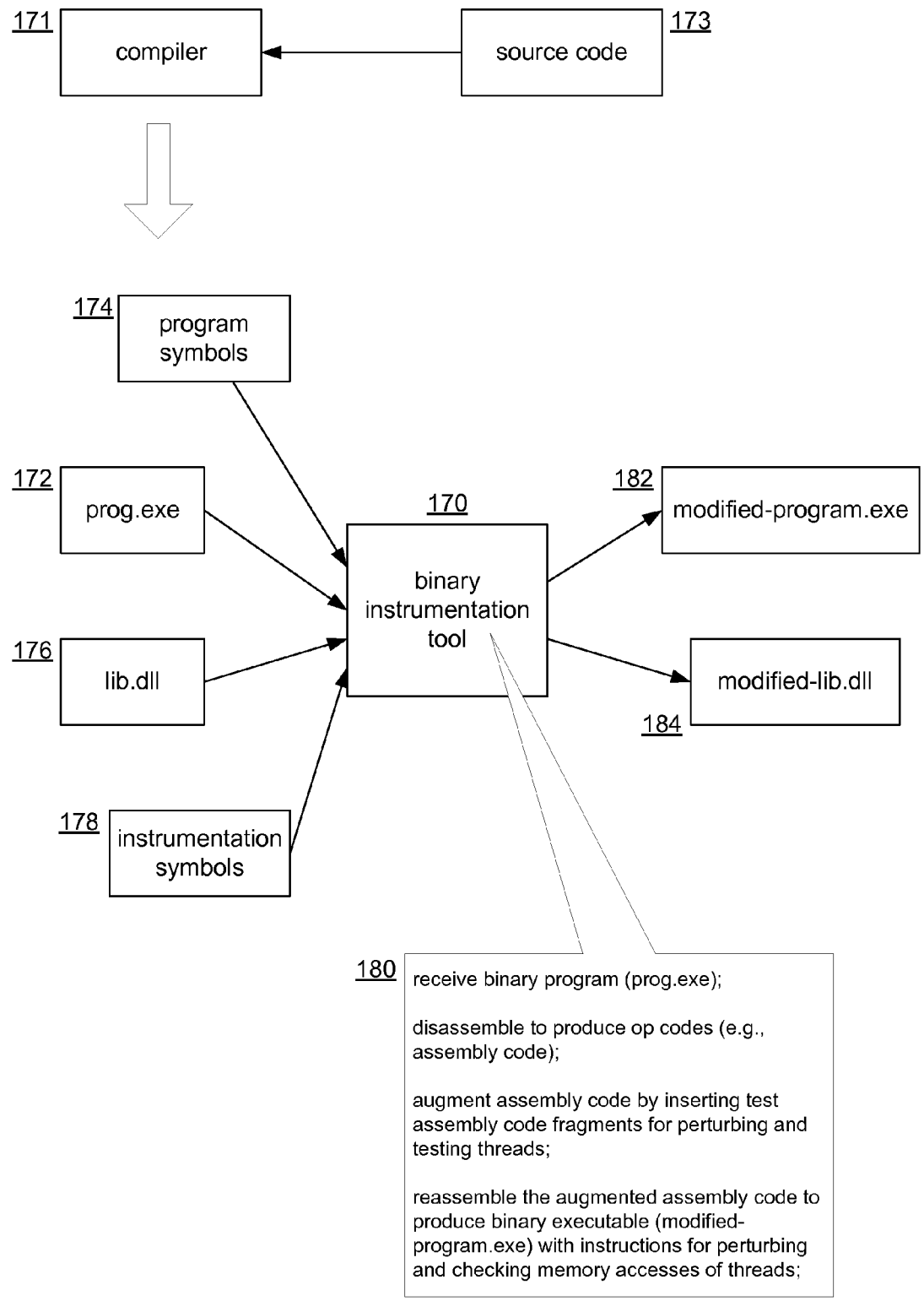
FIG. 3 shows an embodiment for augmenting an application program with code for detecting data collisions.

FIG. 3 shows an embodiment for augmenting an application program with code for detecting data collisions. A binary instrumentation tool 170 performs the actions to be described. It may be assumed that a compiler 171 or the like has produced or compiled a program 172 (e.g., "prog.exe") from source code 173, where the program 172 is in the form of binary code, machine instructions, bytecode, platform-independent intermediate-code, or the like. This program 172 may be referred to as the native or unaugmented program. In sum, program 172 may be any ordinary program compiled or built using any number of widely known programming tools. The binary instrumentation tool 170 may in practice be a combination of executable tools or modules, such as a disassembler, a code parser, symbol table reader and analyzer, etc. A suite such as Vulcan, published by Microsoft Corporation, may serve as a base for the binary instrumentation tool 170; a Vulcan-like suite may be modified to implement various embodiments and techniques described herein.

Accordingly, the instrumentation tool 170 is run and is passed: the program 172, and possibly also program symbols 174 (e.g., a symbol table), any library 176 used by the program 172, instrumentation symbols 178, or any other information (perhaps output by compiler 171) that may be useful in teasing apart program 172 and inserting test code therein. For example, the binary instrumentation tool 170 may perform a process 180 such as receiving the program 172. The program 172 is disassembled using well known tools. The program 172 may thus be reproduced in the form of assembly code or intermediate code which is amenable to analysis and manipulation (for discussion, assembly language will be used as an example). The assembly language program is then analyzed to find suitable memory access operations (described in detail below), and the instrumentation tool 170 then augments the assembly code by inserting test assembly code to perturb or delay execution near the data accesses and to test for data changes (such testing is also described in further detail below). Note that a thread need not be stalled a specific amount of time; delay may be introduced by other techniques such as swapping to a different thread, reducing execution priority of the thread or an encompassing process, etc. The augmented assembly code is then assembled into an executable modified program 182, which is shown in FIG. 3 as "modified-program.exe". Similarly, library 176 may be augmented and assembled as a modified library 184.

The symbol table or symbols 178 may be helpful for embodiments that allow a tester to specify various options. For instance, one embodiment may allow tester to specify which types of memory operations to examine, which data types to consider, whether only data types or symbols updated since a prior compilation are to be considered, and so on. Regardless of any such options, it is possible to produce modified program 182 without requiring a user to manually annotate source code 173 or otherwise interact with the semantic content of source code 173 or program 182; a modified version able to self-detect and self-report actual data collisions may be automatically produced.

Figure 4:
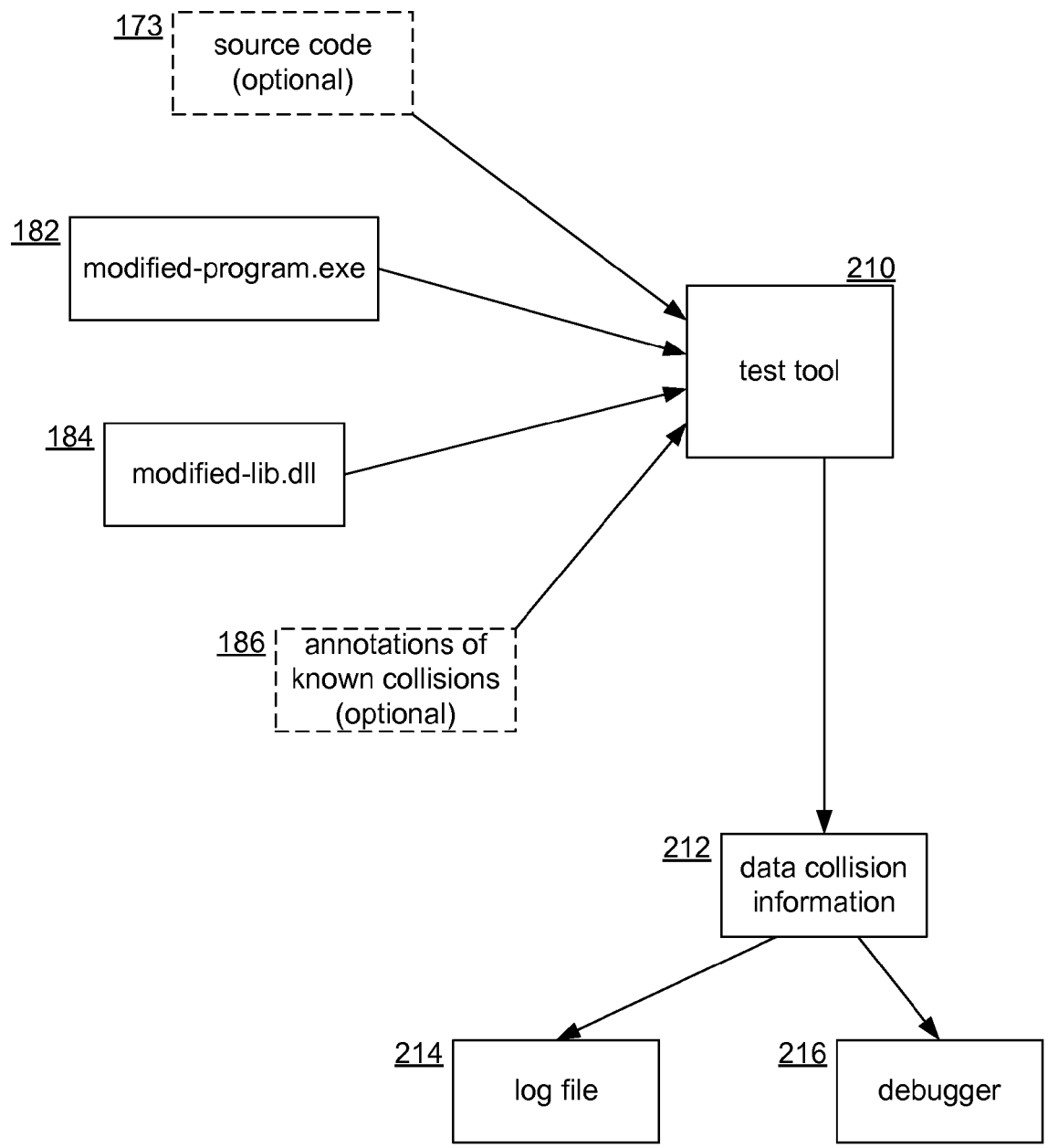
FIG. 4 shows execution of the modified program.

FIG. 4 shows execution of the modified program 182. A test tool 210 may be used to coordinate execution of the modified program 182, although the test tool 210 is not needed. The test tool may also take into account the modified library 184, the source code 173, annotations 186 of known data collisions, and so on (note that any reference to an item herein as being optional should not be understood to imply that other items described herein are required). As the modified program 182 executes it may generate data collision information 212, such as information about a data collision to be stored in a log file 214 or a message to an interactive debugger 216, etc. Any thread context information may be captured, such as a thread ID, registers, a stack snapshot, before/after values, etc.

Figure 5:
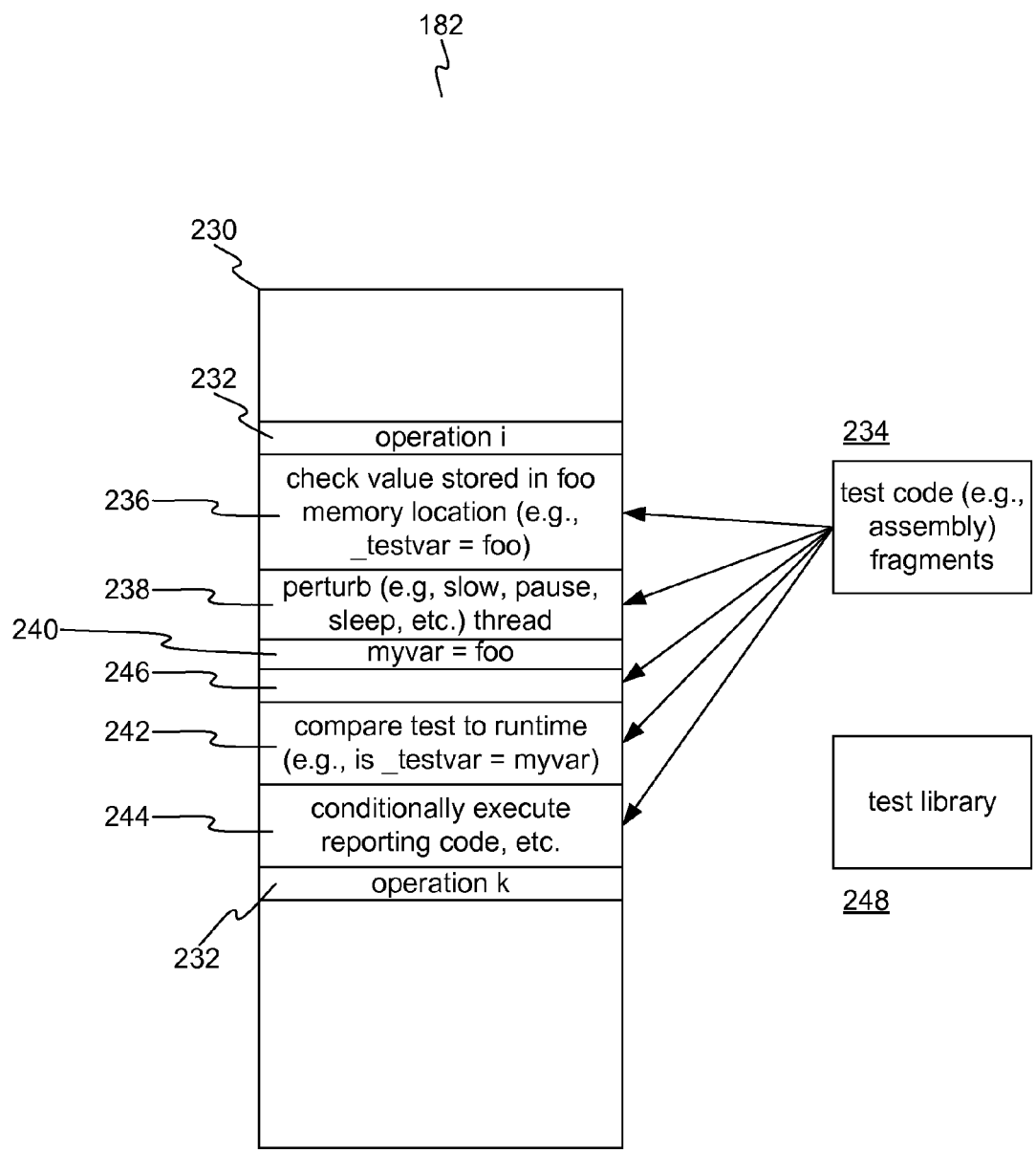
FIG. 5 shows an example modified program.

FIG. 5 shows an example modified program 182. A thread 232 or some portion of modified program 182 capable of concurrency may have included therein both native or non-test operations, as well as instrumentation or test operations 234 for delaying the thread 230. Such operations may include an observation or capture operation 236 that obtains a copy of the content of the shared data to be inspected. A delay operation 238 may perturb the thread 230 by causing it to slow, pause, sleep, loop, etc. (note that a delay can be designed so that, for a given platform or environment, the delay will not result in an execution that could not occur in the unaugmented version of the program). A native access operation 240 may access the shared data. A test or comparison operation 242 may compare the previously captured content of the shared data with the current content of the shared data (e.g., the content of "_testvar" is compared to the content "foo"). An action operation 244 may be executed conditionally if the shared data is found to have changed. Note that the order of the various test operations 234 may vary. For example, in one embodiment, the delay operation 238 may occur before the capture operation 236. In another embodiment, the comparison operation 242 occurs before the native access operation 240.

An embodiment may also be implemented by using debug registers to catch a collision as it is occurring. An operation after operation 240 may set an available debug register to trigger upon access of "foo", and an operation near operation 246 can unset the debug register.

In yet another embodiment, a resume operation 246 may be performed to cause the thread 230 to execute at normal speed (for example, raising the execution priority if the thread 230 has been slowed by lowering its execution priority). In general, the test operations may be understood to operate near or in proximity to the native access operation 240, thereby expanding the time (and therefore probability) during which a data collision may be detected. One of ordinary skill in the art of programming will appreciate that the precise timing and order of the test operations can vary while still achieving the desired detection effect. Moreover, test operations, such as delay and detection can occur with varying proximity to the native access operation 240 if other native operations of the thread 230 are unlikely to interfere with the delay and detection. Moreover, a window of delay in combination with data checking can occur anywhere in the thread 230, regardless of proximity to a native data access 240. However, where delay and detection are associated with a particular identified access operation to a shared memory location, portions of test code 234 may be placed in the modified program 182 in locations based on and relative to the location of the particular access operation.

Test code 234 fragments inserted into the modified program 182 may in practice include references to a test library 248, which may have functions to detect and act on collisions. The test library 248 may be linked to the modified program 182. When a capture operation 236, for example, is called, a corresponding part of test library 248 may be executed to perform multiple operations such as creating a register, reading from a register, storing to a register, etc.

Figure 6:
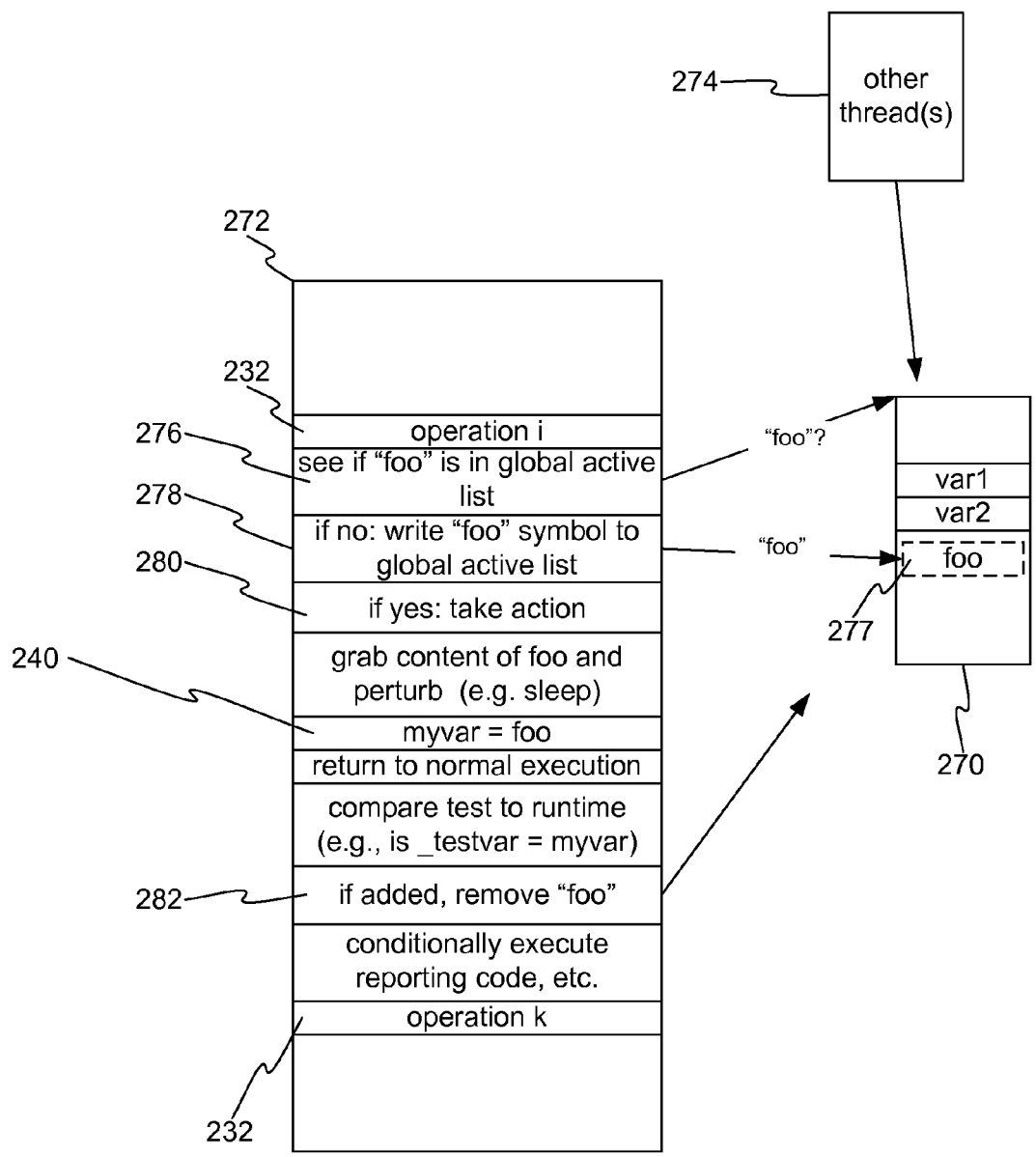
FIG. 6 shows an example that uses a global active list.

FIG. 6 shows an example that uses a global active list 270. Code for a thread 272 may be modified to cause the thread to add a variable or object reference to a global active watch list. Another thread 274 may have similar watch list code. The watch list code may include a test 276 to see if the data location under inspection (e.g., "foo" at the read operation "myvar=foo") is in active use in another thread, that is, there is a check to see if "foo" is already in the global active list 270. If not, then a write operation 278 creates an entry 277 for "foo" in the global active list. If "foo" is in the global active list 270, then a data collision is deemed to have occurred (two threads have indicated, via the global watch list 270, that they are both using the shared data "foo"). If a collision has occurred, then some appropriate test or debug action 280 may be executed. When the thread 272 is done accessing the shared data "foo", it performs a remove operation 282 to remove "foo" from the global active list. The global active list may preferably be used via calls to functions in test library 248.

In practice, each thread will most likely have only one active entry in the global active list at any given time. In this embodiment, the window of delay may begin when the entry 277 is added to the global active list 270 and end when the entry 277 is removed. An artificial delay may be initiated after the entry 277 has been added.

Regarding the duration that a thread may be delayed, an order of magnitude of milliseconds may be sufficient for some applications, although the amount of time may be varied as needed. A tester may use trial and error or experience to find suitable delay times under varying conditions. In one embodiment, a single delay may be used to find multiple of data collisions by performing the delay for an extended window that covers multiple accesses to shared data. When finished, multiple updates may be checked for.

Both static and dynamic approaches may be used to select which data accesses are to be identified and instrumented for data collision detection. A test user may provide the instrumentation tool 170 with static information about what data is to be monitored. For example, the user may indicate specific data types to be included and/or ignored, whether read-write collisions, write-write collisions, or both, are to be considered, and so on. The user may provide information about delay lengths, such as whether to use random delays, whether to consider only recently updated data types, and so on. The instrumentation tool 170 may implement heuristics to dynamically select which data accesses should be instrumented and how to do so. For example, frequency information about execution paths in the program may be used to determine where instrumentation should be placed and how long delays should be; to compensate for the reduced probability of a collision being detected in infrequently executed code paths, such paths may benefit from larger windows of delay to compensate for the lower probability (due to less frequent execution) of a collision being detected.

In another embodiment, a modified compiler may insert the test code into the application program during compile time, for example, in response to a compile flag setting.

With use of the read-delay-compare method described above, it may be possible to ignore mappings from virtual address space to physical address space. That is, the technique may be used without regard for the address space of the memory location. Moreover it may not be necessary to find a complete set of locking mechanisms. Thus, instrumented code may even be executed within the kernel. Furthermore, it is possible to detect collisions with uninstrumented code, by using another process, by direct memory access (DMA) mechanisms, etc. That is to say, external code may perform the same functionality for non-instrumented code.

Figure 7:
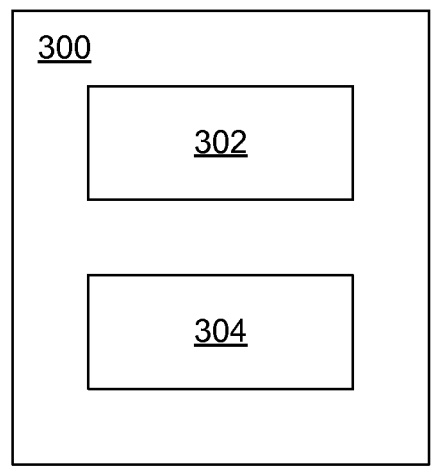
FIG. 7 shows a computer including storage and processor(s).

FIG. 7 shows a computer 300 including storage 302 and processor(s) 304. The storage 302 may include random-access memory (RAM), non-volatile storage such as dynamic RAM, recordable storage media, and/or other current or future storage devices. The storage 302 and processor(s) 304 may cooperate to perform various of the techniques described above, as configured by known and readily available programming tools.

CONCLUSION

Embodiments and features discussed above can be realized in the form of information stored in volatile or non-volatile computer or device readable media. This is deemed to include at least media such as optical storage (e.g., CD-ROM), magnetic media, flash ROM, or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method of testing for potential data collisions between a first thread and a second thread of an application executing on a computer, the first thread and the second thread configured to execute concurrently with respect to each other, the method comprising:
automatically identifying a variable as a test target by determining that the variable is accessed by the first thread by determining that the same variable is also accessed by the second thread;
based on the variable having been identified as a test target, automatically inserting test code into the application, the test code inserted within application code of the first thread and at a location of an access operation within application code of the first thread that accesses the variable, the test code located according to the location of the access operation within the application code of the first thread;
while the first thread and second thread are executing, before the access operation accesses the identified variable shared by the first thread and the second thread, determining, by the test code, whether an indication of the variable is in a list of active variables, and in response to the determining, the test code:
when an indication of the variable is not in the list: adds an indication of the variable to the list induces a delay of the first thread, wherein the second thread continues to execute while the first thread is delayed, and, after the delay, removes the indication of the variable from the list; and
when an indication of the variable is in the list: a collision is determined to have occurred and in response a debugging action is taken.

2. A method according to claim 1, wherein the first thread and the second thread comprise respective execution threads.

3. A method according to claim 1, wherein second test code is inserted in the second thread, the second test code, when the second thread executes, testing for an indication of the variable in the list and, according thereto, adding an indication of the variable or executing a second debugging action.

4. A method according to claim 1, further comprising setting a debug register to trigger when the variable is accessed, and unsetting the debug register after such trigger.

5. A method according to claim 1, wherein the delay of the first thread is induced for a segment of the first thread delineated by a delay construct inserted into the first thread, the delay construct comprising a delay initiation part and a delay termination part, wherein as a result of the delay the segment takes a substantially longer time to execute than if the delay were not induced.

6. A computer-readable storage device storing information to enable a computer to perform a process, wherein the computer-readable storage device is not a signal, the process comprising:
automatically determining that a thread of an application has an access operation that accesses a shared memory location and based thereon automatically inserting test code into native code of the thread at the access operation of the thread of the application, wherein the determining comprises identifying the shared memory location on the basis of the shared memory location having accesses thereto in multiple threads, including the thread; and
executing the application, the application comprising the native code and the test code, wherein when the test code executes the test code determines whether an indication of the shared memory location is in an active-data list, wherein, when an indication of the shared memory location is determined to be in the active-data list, a collision is determined to have occurred and in response a debugging action is invoked, and when an indication of the shared memory location is determined to be not in the active-data list, an indication of the shared memory location is added to the active-data list, an artificial delay of the thread is induced, and the indication of the shared memory location is removed from the active-data list after the delay.

7. A computer-readable storage device according to claim 6, wherein during the artificial delay the thread within which the test code is executing does not otherwise access the shared memory location.

8. A computer-readable storage device according to claim 7, wherein another thread of the application, comprised of second test code, executes during the artificial delay, and wherein the test code comprises a test for presence of an indication of the shared memory location in the active-data list and, according to whether an indication of the shared memory location is determined to be present in the active-data list, either causes such an indication to be added to the active-data list, or invokes the debugging action.

9. A computer-readable storage device according to claim 6, wherein inserting the test code comprises inserting the test code into the application substantially immediately before the thread of the application that accesses the shared memory location.

10. A computer-readable storage device according to claim 6, wherein testing by the test code is performed by capturing content of the shared memory location when beginning the delay and later comparing the captured content to current content of the shared memory location.

11. A computer readable storage device according to claim 10, wherein multiple shared memory locations are tested for updates during the same delay.

12. A computer-readable device according to claim 10, wherein the testing is performed at the end of the delay.

13. A method of detecting a data collision over shared data that is shared by concurrently executing first and second threads of an application, the first thread and the second thread both having code that accesses shared data without a lock, the method comprising:
  automatically locating access operations of the first thread that access the shared data, and in response automatically inserting test code into the first thread at the identified access operations;
  maintaining, by test code inserted into the application, including the test code inserted into the first thread, an active list indicating active shared data items;
  executing the first thread, including executing the test code, the test code, when executed, performing a check to determine whether an indication of the shared data is in the active list, wherein if determined that an indication of the shared data is not in the active list, then an indication of the shared data is added to the active list, wherein the test code causes the first thread to artificially slow or pause near the portions of the first thread that access the shared data, and wherein if determined that the shared data is in the active list then a data collision is determined to have occurred and a corresponding debug action is performed;
  determining, by the test code, if the shared data changed while the first thread was slowed or paused;
  when determined by the test code that the shared data changed, initiating a debugging or testing action; and
  after an access operation has completed, removing, by the test code, if the any indication of the shared data that was added to the active list by the execution of the test code.

14. A method according to claim 13, wherein the debugging or testing action comprises storing information identifying the shared data.

15. A method according to claim 14, wherein the debugging action comprises communicating with an interactive debugger.

16. A method according to claim 13, wherein after the artificial slow or pause a portion of test code inserted into the program after compilation thereof executes in the first thread to determine whether the shared data has changed during the artificial slow or delay.

17. A method according to claim 13, wherein
  when the second thread is to access the shared data, the second thread determines, from an indication of the shared data in the active list, that the second thread is to take a test or debugging action.

* * * * *